United States Patent [19]

Neil

[11] Patent Number: 4,933,942
[45] Date of Patent: Jun. 12, 1990

[54] FREE-ELECTRON LASER WITH DIFRACTION GRATING RESONATOR

[75] Inventor: George R. Neil, San Pedro, Calif.

[73] Assignee: TRW Inc., Redondo Beach, Calif.

[21] Appl. No.: 383,470

[22] Filed: Jul. 24, 1989

[51] Int. Cl.⁵ ............................................. H01S 3/00
[52] U.S. Cl. ......................................... 372/2; 372/99; 372/102
[58] Field of Search ................... 372/2, 99, 92, 94, 93, 372/98, 102

[56] References Cited

U.S. PATENT DOCUMENTS 4,742,522  5/1988  Linford .................................... 372/2
4,748,629  5/1988  Edlin et al. ............................. 372/2
4,845,718  7/1989  Pistoresi ................................. 372/2

Primary Examiner—Léon Scott, Jr.
Attorney, Agent, or Firm—Noel F. Heal; Sol L. Goldstein

[57] ABSTRACT

A free-electron laser including one or more diffraction gratings as part of a resonator structure, to automatically compensate for resonator reflector pointing errors. The angle of reflection of radiation incident on the diffraction grating is frequency-dependent, and this permits compensation of the pointing errors by small shifts in the frequency of operation of the laser, within its normal bandwidth of operation. The technique may be employed in various resonator structures, including a ring resonator.

6 Claims, 1 Drawing Sheet

FREE-ELECTRON LASER WITH DIFFRACTION GRATING RESONATOR

BACKGROUND OF THE INVENTION

This invention relates generally to free-electron lasers and, more particularly, to free-electron lasers that use a resonator cavity to enhance and control the stimulated emission of radiation from an electron beam. In contrast to other laser types in which electrons may be bound to a single atom or molecule, or in which electrons may be free to move through the entire volume of a semiconductor, the free-electron laser produces stimulated emission from a beam of free electrons in a vacuum.

Basically, in a free-electron laser, a beam of relativistic electrons, that is, electrons that have been accelerated to speeds comparable with the speed of light, is passed through a transverse and periodic magnetic field, known as a "wiggler," which results in periodic transverse movement of the electrons. Light is emitted in the direction of the electron beam as a result of the interaction between the electrons and the magnetic field, and is fed back and forth through the wiggler by means of two opposed mirrors. Stimulated emission comes about through the interaction of the electromagnetic wave fed back and forth and the periodic magnetic structure.

U.S. Pat. No. 3,822,410 to Madey entitled "Stimulated Emission of Radiation in Periodically Deflected Electron Beam," describes a free-electron laser, an example of which is depicted in FIG. 1 accompanying this specification. A beam of electrons, indicated by dotted line 1, traveling at velocities approaching the speed of light, that is at relativistic velocities, passes through a series of alternating magnetic fields, which periodically deflect the paths of electrons transversely to their principal direction of movement. These magnetic fields and mechanisms for providing them, for maintaining the convergence of the electron beam, and for injecting and extracting the electron beam from the active region of the laser, are not depicted in detail in FIG. 1, but are simply represented by the lines 2 in the figure. Reference may be made to the aforementioned Madey patent for a more detailed description of this aspect of the free-electron laser. As pointed out in the Madey patent, either periodic electric or periodic magnetic fields may be used to deflect the electrons, although magnetic fields are more easily provided.

Within the active region of the free-electron laser (FEL) the beam of electrons 1 travels along and is deflected about a center line 3 of the FEL. Mirrors 4 and 5 operate together to form a resonator, the axis of which is coincident with the center line 3, and hence with the electron beam 1 within the active region of the FEL 2. As depicted in FIG. 1, mirrors 4 and 5 are spherical or parabolic in shape so as to focus radiation incident on them into a small cross-sectional area within the active region of the FEL 2. Typically, radiation is extracted from the device as a beam 6 passing through one of the mirrors, such as mirror 5, which is made only partially reflective.

As indicated in the Madey patent, a free-electron laser may be used to provide continuous lasing action at power levels as high as five megawatts. However, when one attempts to scale the operation of such free-electron lasers to even higher power levels, practical problems arise in that the mirrors used to form the resonator cannot withstand the high energy density of the incident radiation. For instance, for a free-electron laser having an active region of five meters in length, and resonator mirrors spaced seven meters apart, an energy density of $10^8$ watts/cm$^2$ is incident on the mirrors and results in approximately $10^4$ watts being absorbed by the mirrors. This causes a significant heating problem for the mirrors.

One way to reduce the heating problem is to move the mirrors further apart. Because the radiation from the free-electron laser diverges slightly, the radiation spreads over a larger area of the mirrors as the spacing between the mirrors is increased. For instance, if the active region is approximately five meters long and the spacing between mirrors is increased from seven meters to approximately 200 meters, the energy density of the radiation incident on the mirrors is decreased by a factor of approximately 800. As a consequence of increasing the spacing between mirrors by a factor of 25 to 30, the power level can be increased by a factor of approximately 6,000 while maintaining the same energy density on the mirrors.

If the spacing between the mirrors 4 and 5 in FIG. 1 is increased significantly, it is apparent that, in order to maintain the center of the resonator formed by these mirrors coincident with the electron beam 1 within the active region of the FEL 2, the pointing accuracy of the mirrors must be improved in proportion to the increase in spacing between them. Unfortunately, at spacings of 10's to 100's of meters, the required pointing accuracies are extremely difficult to maintain. Accordingly, there is a need for a new technique for reducing the pointing accuracy requirement of cavity mirrors employed in free-electron lasers. The present invention satisfies this need, as will be apparent from the following summary.

SUMMARY OF THE INVENTION

The present invention uses one or more diffraction gratings in place of one or more of the resonator mirrors, to significantly reduce the pointing accuracy requirements for the mirrors, and to compensate for existing pointing errors. A typical free-electron laser will lase over a bandwidth of approximately one percent (1%) of its nominal frequency. The invention utilizes this bandwidth, in combination with the frequency dependence of the angle of reflection of radiation incident upon a diffraction grating, to reduce the pointing angle accuracy requirements.

More specifically, the line spacing and orientation of a diffraction grating are selected to reflect incident radiation in the direction of the active region of the laser. The grating is oriented to obtain this reflection at the middle of the frequency band in which lasing action is obtained. If, for some reason, the angular orientation of the diffraction grating is disturbed slightly in a direction normal to the grating lines, the grating will continue to reflect incident radiation into the laser, but such reflection will occur at a slightly different frequency. For a sufficiently slow disturbance in the angular orientation of the grating or of the other mirrors in the system, a feedback mechanism inherent in the action of the resonator and the diffraction grating will cause the frequency of emission from the laser to shift slightly to the frequency for which the diffraction grating again reflects radiation back into the laser. Thus, the invention causes and allows the frequency at which energy is emitted from the laser to shift slightly to compensate for disturbances in the angular orientation of the resonator mirrors. Therefore, the laser may be operated successfully at larger reflector spacings, and hence at higher power levels. Although the gratings used in the invention will not tolerate energy densities as high as those tolerated by mirrors, the larger reflector spacing that may be used with the gratings more than compensates for the lower energy densities at the reflectors, and allows the laser to operate at significantly higher power levels.

It will be appreciated from the foregoing that the present invention represents a significant advance in the field of free-electron lasers. In particular, the present invention provides a novel technique for reducing the pointing accuracy requirements for laser mirrors in a free-electron laser, thereby permitting the mirrors to be spaced further apart for operation at higher power levels. Other aspects and advantages of the invention will become apparent from the following more detailed description, taken in conjunction with the accompanying drawings.

DESCRIPTION OF THE PREFERRED EMBODIMENTS

Figure 1:
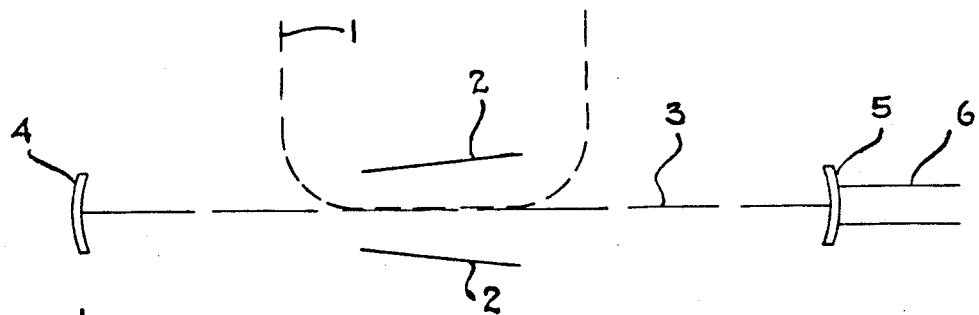
FIG. 1 is a simplified schematic view of a free-electron laser of the prior art.
Figure 2:
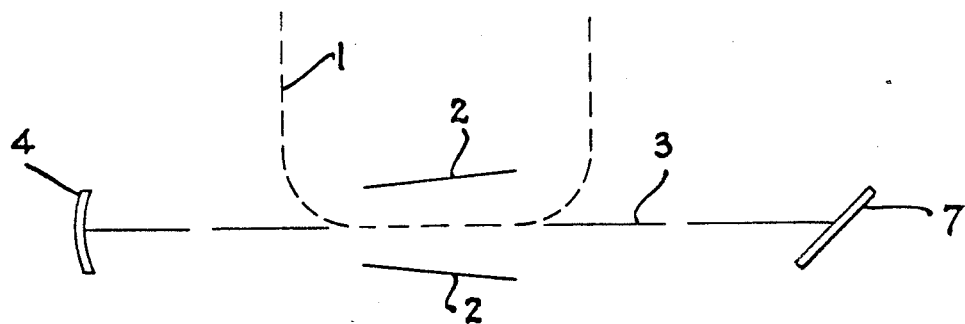
FIG. 2 is a simplified schematic view of a free-electron laser in accordance with the invention.

As shown in the drawings for purposes of illustration, the present invention is concerned with an improved free-electron laser (FEL) system. FIG. 2 depicts an FEL similar to that shown in FIG. 1, except that the mirror 5 in FIG. 1 has been replaced by a diffraction grating 7 in FIG. 2. All of the other elements in FIG. are the same as those in FIG. 1.

Diffraction grating 7 is preferably a blazed reflection grating and either has a slight spherical or parabolic curvature, or is combined with an additional curved mirror to obtain the desired focusing the reflected radiation. The grating line spacing within the diffraction grating 7 is selected to reflect radiation from the FEL 2 incident on grating 7 back along the center line 3 of the resonator, referred to herein as the optical axis of the resonator, and into the active region of the FEL 2, to coincide with the location of the electron beam 1 within the active region.

The grating line spacing and angle are selected so as to obtain such reflection at the center frequency of the lasing action of the FEL 2. For example, at a wavelength of 0.5 micrometers, a grating angle of approximately 17.5 degrees results if the grating is ruled at 1,200 lines/mm. If for some reason, such as mechanical or thermal distortion, the angular orientation of the diffraction grating 7 is disturbed by a small amount in a direction in a plane normal to the grating lines, then the incident radiation at the center frequency of lasing action will no longer be reflected along the optical axis 3. However, because the angle of reflection from diffraction grating 7 depends upon the frequency of the incident radiation, radiation at a slightly different frequency from the nominal or center frequency will still be reflected along center line 3. Therefore, the laser can continue to operate successfully, but operation will now be at a frequency slightly different from that at which the laser operated prior to perturbation of the orientation of the grating 7.

In effect, the resonator inherently provides the essential elements of a feedback control system with a positive feedback gain for the on-axis optical rays. That is to say, the resonator naturally reinforces optical rays on the central resonator axis, and the FEL is forced to operate at the frequency corresponding to these on-axis rays. When the FEL is operating at its nominal frequency and all the components are properly aligned, light at the nominal frequency will be propagated along the central resonator axis. But when there is an angular pointing error in one of the optical components, rays on the central axis will be of a different frequency and it will be this frequency that is reinforced by the resonator, thereby forcing the FEL to adjust its output frequency.

Because the free-electron laser 2 is capable of operation over a frequency range of typically one percent (1%), significant angular perturbations in the orientation of the grating 7 or other mirrors in the system may be compensated in this manner. For the example discussed above, an angular deviation of 10 microradians would be compensated by a wavelength shift of less than $2 \times 10^{-5}$ microns The rate at which the frequency is required to change must be slow compared to the fill time of the cavity. For the example given, if the laser gain were 10% in a 200-meter cavity, the system could compensate for approximately 10 microradians of change in 700 microseconds.

Although a single diffraction grating compensates for angular pointing errors only in a plane normal to the grating lines, the most significant pointing errors may be compensated by orienting the grating lines approximately normal to the direction in which the greatest pointing errors occur. For instance, when the reflecting elements are mounted on a table the pointing errors in a plane normal to the surface of the table are typically much greater than the pointing errors in a plane parallel to that of the table. Accordingly, in such a circumstance the diffraction grating would be oriented so that the grating lines were approximately alternative is to provide two gratings oriented at ninety degrees to each other, to allow for correction of angular movements about two orthogonal axes.

Figure 3:
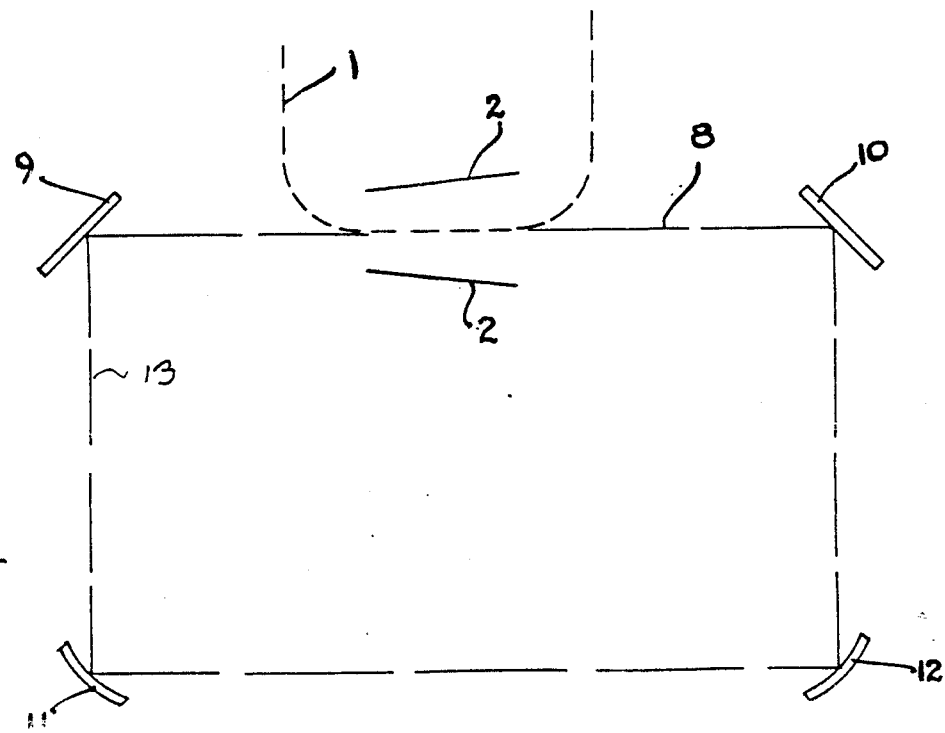
FIG. 3 is a simplified schematic view of another embodiment of the invention, implemented in a ring resonator configuration.

Although the resonator in the embodiment described with reference to FIG. 2 was formed by two reflectors, a greater number of reflectors could be used. FIG. 3, for example, depicts a resonator formed by four reflectors 9, 10, 11 and 12 arranged in a ring and providing for circulating radiation around the ring along a path 13, in a manner analogous to ring resonators used in other types of lasers. In FIG. 3, each of the reflectors 9, 10, 11 and 12 can be either mirrors or diffraction gratings. However, in order to obtain the desired correction of angular pointing errors, at least one of these reflectors must be a diffraction grating.

In FIG. 3, not all of the reflectors 9, 10, 11, 12 need be spherical or parabolic in shape, although normally at least two of these reflectors will be curved, to focus the radiation circulating along the path 13 within the active region of the FEL 2. The path 13 is also referred to as the optical axis of the resonator for purposes of claiming the present invention.

It will be appreciated from the foregoing that the present invention represents a significant advance in the field of free-electron lasers. In particular, the present invention provides a simple but effective technique for reducing the accuracy requirement for angular pointing errors in the mirrors employed in the active regions of the free-electron laser. With the reduction of pointing beam accuracy requirements, there follows the ability to increase the mirror spacings and obtain a corresponding increase in laser beam output powers.

A further advantage of the invention is that, by proper design of the grating angle and blaze, optical power can be outcoupled from the resonator by utilizing higher orders of the grating. This outcoupled optical power could be the desired output of the FEL, or could be a smaller level of power used for control or analysis of the FEL.

It will also be appreciated that, although a number of embodiments of the invention has been described in detail for purposes of illustration, various modifications may be made without departing from the spirit and scope of the invention. Accordingly, the invention is not to be limited except as by the appended claims.

I claim:

1. A free-electron laser, comprising:
   means for generating and directing a relativistic beam of electrons along a beam axis;
   means for applying spatially periodic deflections to electrons in the beam, in a direction transverse to the beam axis, to provide stimulated emission of light in a direction approximately coincident with the electron beam; and
   resonator means including multiple reflectors providing for repeated reflection of light within the resonator means at a nominal frequency, and means for coupling light out of the resonator means; wherein at least on of the multiple reflectors is a diffraction grating, having multiple parallel grating lines of which the spacing and orientation are selected to reflect a portion of radiation incident on the grating back along the resonator axis:such that angular movement of at least one or the reflectors about an axis parallel to the grating lines results in reestablishment of stable operation of the resonator means:the resonator axis being substantially coincident with the beam axis, said laser having a slightly different frequency of operation corresponding to a different angle of reflection.

2. A free-electron laser as defined in claim 1, wherein:
   two of the multiple reflectors are diffraction gratings, having grating lines oriented at ninety degrees to each other, to provide for compensation of angular movements about any axis.

3. A free-electron laser as defined in claim 2, wherein at least three reflectors, an oriented to form a ring resonator, having a resonator axis of which a portion is approximately coincident with the beam axis.

4. A free-electron laser as defined in claim 5, wherein:
   at least three reflectors, an oriented to form a ring resonator cavity, having a resonator cavity axis of which a portion is approximately coincident with the beam axis.

5. A free-electron laser, comprising:
   means for generating and directing a relativistic beam of electrons along a beam axis;
   means for applying spatially periodic deflections to electrons in the beam, in a direction transverse to the beam axis, to provide stimulated emission of light in a direction approximately coincident with the electron beam; and
   a resonant cavity having a resonant cavity axis and defined in part by multiple reflectors aligned to provide repeated reflections of light within the cavity at a normal frequency within a bandwidth;
   at least one of said reflectors being a diffraction grating having parallel grating lines selected in spacing and orientation to provide for reflection at the nominal frequency, along the cavity axis, such that angular movement of any of the reflectors about a selected axis results in continued stable oscillation within the cavity at a frequency slightly shifted from the nominal frequency, to maintain the resonant cavity axis in substantial alignment with the beam axis.

6. For use in a free-electron laser having means for generating and directing a relativistic beam of electrons along a beam axis, and means for applying spatially periodic deflections to electrons in the beam, in a direction transverse to the beam axis, to provide stimulated emission of light in a direction approximately coincident with the electron beam, and having a resonator with a resonator axis approximately coincident with the beam axis, a method for stabilizing the position of the resonator axis so as to be substantially coincident with the beam axis, the method comprising the steps of:
   selecting and positioning a diffraction grating to serve as at least one reflector in the resonator; and
   automatically adjusting the frequency of operation of the resonator, within a bandwidth of the free-electron laser, to compensate for small angular movements of the diffraction grating and other resonator reflectors.

* * * * *